United States Patent
Ahuja et al.

(10) Patent No.: US 10,956,456 B2
(45) Date of Patent: *Mar. 23, 2021

(54) METHOD TO DETERMINE COLUMNS THAT CONTAIN LOCATION DATA IN A DATA SET

(71) Applicant: International Business Machines Corporation, Armonk, NY (US)

(72) Inventors: Shilpi Ahuja, San Jose, CA (US); Rafael J. Z. Bastidas, Caracas (VE); Rashmi Gangadharaiah, San Jose, CA (US); Mary A. Roth, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 965 days.

This patent is subject to a terminal disclaimer.

(21) Appl. No.: 15/363,617

(22) Filed: Nov. 29, 2016

(65) Prior Publication Data

US 2018/0150765 A1 May 31, 2018

(51) Int. Cl.
*G06F 16/29* (2019.01)
*G06N 20/00* (2019.01)
(Continued)

(52) U.S. Cl.
CPC ............ *G06F 16/29* (2019.01); *G06F 16/221* (2019.01); *G06N 5/022* (2013.01); *G06N 20/00* (2019.01); *G06N 20/10* (2019.01); *G06N 20/20* (2019.01)

(58) Field of Classification Search
CPC ........ G06N 20/00; G06N 20/10; G06N 20/20; G06N 5/022; G06F 16/221; G06F 16/29
(Continued)

(56) References Cited

U.S. PATENT DOCUMENTS

| 7,570,816 B2 | 8/2009 | Bergeron et al. |
| 7,921,072 B2 | 4/2011 | Bohannon et al. |

(Continued)

FOREIGN PATENT DOCUMENTS

| EP | 1669896 | 6/2006 |
| WO | 2006103398 | 10/2006 |

(Continued)

OTHER PUBLICATIONS

Bivand, R. S., Pebesma, E., & Gomez-Rubio, V., Spatial Data Import and Export. Applied Spatial Data Analysis with R, 83-125, Springer, 2013, 379 pages.

(Continued)

*Primary Examiner* — Shane D Woolwine

(74) *Attorney, Agent, or Firm* — Steven Bouknight; Edell, Shapiro & Finnan, LLC

(57) ABSTRACT

A method of identifying location data in a data set comprises generating a data sample from the data set, training a plurality of models with the data sample to identify the location data in the data set, and applying the data set to the trained models to determine the location data within the data set. The plurality of models includes one or more first models to identify primary attributes of the location data indicating a geographical area and one or more second models to identify secondary attributes of the location data used to determine corresponding primary attributes.

10 Claims, 13 Drawing Sheets

(51) Int. Cl.
*G06F 16/22* (2019.01)
*G06N 5/02* (2006.01)
*G06N 20/10* (2019.01)
*G06N 20/20* (2019.01)

(58) Field of Classification Search
USPC .......................................................... 706/12
See application file for complete search history.

(56) References Cited

U.S. PATENT DOCUMENTS

| | | | |
|---|---|---|---|
| 8,176,016 | B1 | 5/2012 | Dai et al. |
| 9,501,466 | B1* | 11/2016 | Namjoshi ............ G06F 16/3332 |
| 2003/0217069 | A1 | 11/2003 | Fagin et al. |
| 2007/0168370 | A1 | 7/2007 | Hardy |
| 2008/0312904 | A1* | 12/2008 | Balchandran ....... G06F 17/2715 704/9 |
| 2009/0125529 | A1 | 5/2009 | Vydiswaran et al. |
| 2009/0248605 | A1* | 10/2009 | Mitchell ............. G06F 17/2705 706/52 |
| 2010/0223215 | A1* | 9/2010 | Karypis ................ G06Q 10/04 706/12 |
| 2013/0297661 | A1* | 11/2013 | Jagota ................... G06Q 30/02 707/822 |
| 2014/0258269 | A1 | 9/2014 | Slifer |
| 2015/0026181 | A1 | 1/2015 | Milton et al. |
| 2015/0254555 | A1* | 9/2015 | Williams, Jr. ....... G06N 3/0454 706/14 |
| 2015/0286682 | A1 | 10/2015 | Ziauddin |

FOREIGN PATENT DOCUMENTS

| | | |
|---|---|---|
| WO | 2009086312 | 7/2009 |
| WO | 2011053337 | 5/2011 |
| WO | 2012006509 | 1/2012 |
| WO | 2013074379 | 5/2013 |

OTHER PUBLICATIONS

Ardeshir, S., Zamir, A. R., Torroella, A. et al., GIS-assisted object detection and geospatial localization, European Conference on Computer Vision, 602-617, 2014, 16 pages.

QDA Miner 4 User's Guide, http://provalisresearch.com/Documents/QDAMiner40.pdf, Provalis Research, 2004-2011, 241 pages.

Evans, "Make More Useful Layers from CSV Files", https://www.esri.com/~/media/Files/Pdfs/news/arcuser/0116/make-more-useful-layers-from-csv-files.pdf, retrieved from internet Aug. 2016, pp. 50-51.

Informatica AddressDoctor, https://www.informatica.com/content/dam/informatica-com/global/amer/us/collateral/other/iad-560_user-guide.pdf, Product Documentation, Version 5.6.0, Nov. 5, 2014, 172 pages.

Get Started with ArcGIS Online, Add a layer from a CSV file, https://learn.arcgis.com/en/projects/get-started-with-arcgis-online/lessons/add-a-layer-from-a-csv-file.htm, retrieved from internet Aug. 2016, 8 pages.

GDAL—Geospatial Data Abstraction Library, http://gdal.org/1.11/index.html, retrieved from internet Aug. 2016, 1 page.

WordStat 7 User's Guide, http://provalisresearch.com/Documents/WordStat7.pdf, Provalis Research, 1989-2014, 199 pages.

Address Verification, GBG Loqate, http://www.loqate.com/validate/address-verification/, retrieved from internet Aug. 2016, 6 pages.

GeoTopicParser, http://wiki.apache.org/tika/GeoTopicParser, retrieved from internet Aug. 2016, 4 pages.

Welcome to Tableau Desktop, Version 10.0, http://onlinehelp.tableau.com/v10.0/offline/en-us/tableau_desktop_10.0.pdf, retrieved from internet Aug. 2016, 1596 pages.

Google Fusion Tables, https://support.google.com/fusiontables/?hl=en#topic=1652595, retrieved from internet Aug. 2016, 2 pages.

Workshops, ICDM 2016, retrieved from internet Aug. 2016, 2 pages.

List of IBM Patents or Patent Applications Treated as Related, Jan. 2018, 1 Page.

* cited by examiner

| FEATURES AROUND COLUMN VALUES | | | | | |
|---|---|---|---|---|---|
| STREET | CITY | STATE | ZIP | LATITUDE | LONGITUDE |
| TYPE OF CHARACTERS IN THE STRING ARE APPROPRIATE FOR THAT CATEGORY. FOR EXAMPLE: U.S STATES ONLY HAVE ALPHABETS OR WHITE SPACES AS PERMISSIBLE CHARACTERS. | | | | | |
| LENGTH OF STRING FALLS IN APPROPRIATE RANGE FOR THAT CATEGORY. FOR EXAMPLE: VALID LENGTH OF U.S ZIP CODE IS 5 OR 10 CHARACTERS | | | | STRING CONTAINS FIRST CHARACTER AS A COMPASS DIRECTION [N,S,E,W] OR FIRST CHARACTER IS A + OR - SIGN FOLLOWED BY A DIGIT OR THE FIRST CHARACTER IS A DIGIT . FOR E.G. +32.30642, N 34, 34 | |
| STRING CONTAINS NORMAL PO BOX FORMAT OR PO BOX FOR MILITARY OR RURAL ADDRESS. FOR EXAMPLE: 'PO BOX 219', 'ROUTE 1, BOX 222' | FIRST CHARACTER IS UPPER-CASE ALPHABET | BOTH CHARACTERS ARE UPPER-CASE ALPHABETS AND LENGTH IS 2 | | IF THE STRING CONTAINS DECIMAL DEGREES FORMAT (DDD.DDDD) AND THE LAST CHARACTER OF THE STRING IS EITHER A COMPASS DIRECTION, A DIGIT OR DEGREE SYMBOL AND THE INTEGER PART FOR THE NUMBER IS IN RANGE OF -180 TO +180 FOR A LONGITUDE (AND -90 TO +90 FOR LATITUDE.) FOR E.G. 34.532S IS A POSITIVE EXAMPLE WHEREAS 10.32 X IS A NEGATIVE EXAMPLE | |
| STRING CONTAINS VALID STREET SUFFIX OR VALID STREET SUFFIX FOLLOWED BY VALID GEOGRAPHIC LOCATION. FOREXAMPLE: '816 POTTLE AVE.' , '4784EAST DAYTON STREET ', '102 BAKER ST. EAST' | STRING MATCHES ONE OF THE CITIES (LOOKUP AGAINST A SMALL DICTIONARY OF POPULAR CITIES) | STRING MATCHES A STATE NAME OR STATE CODE | | IF THE STRING CONTAINS DEGREES, MINUTES AND SECONDS FORMAT WITH EITHER DDD°MM'SS.SSS" OR DDD MM SS.SSS WHERE DDD IS IN RANGE OF -180 TO +180 FOR A LONGITUDE (AND -90 TO +90 FOR LATITUDE.) AND BOTH SECONDS AND MINUTES ARE IN RANGE FROM 0-59 AND THE LAST CHARACTER OF THE STRING IS EITHER A COMPASS DIRECTION, A DIGIT OR DOUBLE QUOTE SYMBOL E.G.: 32°18'23.1" N, N 22°36'52.5", 22 36 52.5 | |
| STRING CONTAINS UNIT DESIGNATORS FOLLOWED BY NUMBERS. FOR EXAMPLE: '47S LENFANT PLZ SW RM 6627' | STRING MATCHES ONE OF MOST POPULAR COUNTRY NAMES (NEGATIVE FEATURE) | | | IF THE STRING CONTAINS DEGREES AND MINUTES FORMAT WITH EITHER DDD°MM.MMM' OR DDD MM.MMM WHERE DDD IS IN RANGE OF -180 TO +180 FOR A LONGITUDE (AND -90 TO +90 FOR LATITUDE.) AND MINUTES ARE IN RANGE FROM 0-59 AND THE LAST CHARACTER OF THE STRING IS EITHER A COMPASS DIRECTION, A DIGIT OR SINGLE QUOTE SYMBOL E.G. 32°18.385' N, N 22°36.875', 22°36.875', +22°36.875', +22°36' | |
| STRING BEGINS WITH 1 OR MORE DIGITS, FOLLOWED BY A DIRECTION INDICATOR | STRING MATCHES A STATE NAME (NEGATIVE FEATURE) | | | IF THE STRING CONTAINS WEB MERCATOR 1984 FORMAT(EPSG:3857). E.G. -9813189.069380788, 5125703.836258324 FOR LATITUDE THE INTEGER PART OF THE NUMBER MUST BE >= 90 AND <= 20037508.3427892 FOR LONGITUDE THE INTEGER PART OF THE NUMBER MUST BE >= 180 AND <= 20037508.3427892 | |

FIG.10

METHOD TO DETERMINE COLUMNS THAT CONTAIN LOCATION DATA IN A DATA SET

BACKGROUND

1. Technical Field

Present invention embodiments relate to computer systems and methods for determining the location of specific types of data in a data set, and more specifically, to computer systems and methods for determining columns that contain location data in a data set.

2. Discussion of the Related Art

Recent estimates indicate that 70% of the time spent on data analytics is spent in data wrangling: the process of obtaining, understanding, extracting and reformatting data into a format that makes it easier to combine with other data and to be consumed by data science tools and applications. For example, in the geospatial domain, many powerful Geospatial Information Systems (GIS) and mapping tools exist to make it easy to visualize geospatial patterns in data. However, such tools and systems typically require that the input data is already geo-coded with geospatial coordinates, or require that the input data is formatted in a rigid input format with geospatial values easily identified.

The burden is often upon the user to inspect and prepare the data set to match the required input format. This can be a tedious and time-consuming process for a variety of reasons. The size of the input data set can be overwhelming, not only in the number of rows but also in the number of columns. For example, the city of Austin open data portal includes a data set that contains property permit code violations. The file contains 126 columns, with 13 columns containing geospatial data.

Column labels can also be missing, ambiguous or misleading. For example, as shown in Table I below, in the Austin data set referred to above, a street address is provided in a column with a column header of 'Foldername.'

TABLE I

| Foldername | mstat | Mcity |
| --- | --- | --- |
| 555 Bailey | CA | San Jose |
| 380 Bird Avenue | CA | Sunnyvale |
| 760 Ford Street | AZ | Phoenix |

Additionally, geospatial data may be spread across multiple columns. For example, street addresses may be spread across multiple columns as shown in Table II below.

TABLE II

| house | Street | type | unittype | unitnumber |
| --- | --- | --- | --- | --- |
| 9200 | North | Plz | Unit | 2003 |
| 3429 | Willowrun | Rd | Bldg | 104 |
| 6808 | Damien | Blvd | Unit | 313 |

Moreover, geospatial data may be embedded within the text of another column, e.g., as shown in Table III below.

TABLE III

| Coordinates | Location |
| --- | --- |
| (40.59649030298516, −74.16599111879503) | POINT (−97.9597459 30.3199622) |

TABLE III-continued

| Coordinates | Location |
| --- | --- |
| (40.624676988640616, 73.98558950115074) | POINT (−97.9008141 30.363329) |

Geospatial data may further be coded in such a way as to require a look-up table to identify the location. Examples of such codes include school and congressional district codes, airport codes, country codes, and geodesic place codes such as FIPS (Federal Information Processing Standard). Table IV below shows an example of how geospatial data may be coded with school district codes.

TABLE IV

| County | School | District Code |
| --- | --- | --- |
| 0 | 0 | 10017 |
| 1 | 109835 | 10017 |
| 1 | 109836 | 10017 |

Also, how data is expressed and formatted can vary greatly from one source to another. For example, as shown in Table V below, foreign addresses may be formatted differently than U.S. addresses, and even U.S. addresses can be expressed in a variety of ways. In the U.S., addresses can be expressed with street addresses, with or without directions, P.O. boxes, rural and military routes, etc. Moreover, users who are given a free-form text box to input data will invariably introduce numerous spellings, abbreviations, and synonyms as data is collected.

TABLE V

| US Addresses | Canadian |
| --- | --- |
| 4417 Brooks N Street | 125 Allandale Road |
| 47s Lenfant PLZ SW | 123 Maple Road West |
| PO Box 34 | 123 MAPLE RD W |
| Post Office Box 1349 | Apartment 920 |
| RR 3 Box 9 (rural) | APT 920 |
| HC 72 BOX 293 (military) | MNT-ARLING-HT (municipality abbreviation) |

Thus, it will be appreciated that the variety of ways data can be formatted in a structured data set on a computer poses a major challenge to data wrangling.

SUMMARY

According to one embodiment of the present invention, a method of identifying location data in a data set comprises generating a data sample from the data set, training a plurality of models with the data sample to identify the location data in the data set, wherein the plurality of models includes one or more first models to identify primary attributes of the location data indicating a geographical area and one or more second models to identify secondary attributes of the location data used to determine corresponding primary attributes, and applying the data set to the trained models to determine the location data within the data set. An advantage of this embodiment is that location data may be extracted from large data sets even if the data is not formatted in a normalized manner. Moreover, the method need not be domain specific, so models can be added, deleted, or updated as needed to support new attributes as well as new formats.

According to another embodiment of the present invention, a system for identifying location data in a data set comprising at least one processor configured to generate a data sample from the data set, train a plurality of models with the data sample to identify the location data in the data set, wherein the plurality of models includes one or more first models to identify primary attributes of the location data indicating a geographical area and one or more second models to identify secondary attributes of the location data used to determine corresponding primary attributes, and apply the data set to the trained models to determine the location data within the data set. An advantage of this embodiment is that location data may be extracted from large data sets even if the data is not formatted in a normalized manner. Moreover, the system need not be domain specific, so models can be added, deleted, or updated as needed to support new attributes as well as new formats.

According to yet another embodiment of the present invention, a computer program product for identifying location data in a data set is provided, the computer program product comprising a computer readable storage medium having program instructions embodied therewith, the program instructions executable by a computer processor to cause the computer processor to generate a data sample from the data set, train a plurality of models with the data sample to identify the location data in the data set, wherein the plurality of models includes one or more first models to identify primary attributes of the location data indicating a geographical area and one or more second models to identify secondary attributes of the location data used to determine corresponding primary attributes, and apply the data set to the trained models to determine the location data within the data set. An advantage of this embodiment is that location data may be extracted from large data sets even if the data is not formatted in a normalized manner. Moreover, the computer program product need not be domain specific, so models can be added, deleted, or updated as needed to support new attributes as well as new formats.

In still another embodiment, the data set may include columns of data and one or more headers for the columns, and a data sample may be generated by determining for insertion into the data sample a column header and one or more distinct frequently used values for each corresponding column. Generating a data sample according to this embodiment may help prevent empty or null values from being selected, and may also make it possible to disambiguate attributes when there is overlap in data.

In a further embodiment, the one or more first models may each identify a corresponding primary attribute and be configured to extract header features and value features of the corresponding primary attribute from the data sample, and utilize the header features and value features to identify columns containing the corresponding primary attribute. Extracting the header features may include identifying aliases within the data sample used to represent a name of the corresponding primary attribute, categorizing the identified aliases into categories each representing a corresponding header feature, and creating a header feature set based on the categories and utilize the header feature set to identify the header of columns of the corresponding primary attribute. Extracting header features allows present invention embodiments to take advantage of existing metadata in the data set and may reduce processing time. Extracting the value features may include identifying characteristics of a value of the corresponding primary attribute each representing a corresponding value feature, and creating a value feature set based on the characteristics and utilize the value feature set to identify values of the corresponding primary attribute. Extracting value features may allow present invention embodiments to differentiate columns containing location data from other columns when the header is missing or ambiguous.

In yet another embodiment, the plurality of models may be trained by training the one or more first models with the data sample to identify the primary attributes, and training the one or more second models with the data sample and identified primary attributes from the one or more first models to determine the secondary attributes. Training models according to this embodiment may reduce the time and effort needed to train the models.

In an example embodiment, the plurality of models may be tested with the data sample to produce location data, and re-train the plurality of models based on information received from a user pertaining to the location data produced by the plurality of models. Such embodiment may allow the models to reflect a user's preference.

In an additional embodiment, the location data is one or more selected from a group of: distributed across a plurality of the columns of the data set; aggregated with other data within a column of the data set; coded within the data set; and residing in a column of the data set lacking a header or containing an ambiguous header.

BRIEF DESCRIPTION OF THE DRAWINGS

Generally, like reference numerals in the various figures are utilized to designate like components.

FIG. 10 is a table listing features around column values according to an example embodiment of the present invention.

DETAILED DESCRIPTION

Present invention embodiments use machine learning in a unique manner to efficiently and automatically identify the categories of attributes present within a data set on a computer. In an example embodiment, geospatial attributes may be identified in this manner in order to automatically prepare and geo-code data for use by another computer program or application, such as a customizable weather alerting service that warns clients of severe weather near clients' respective geographical locations, or a geographical information system ("GIS") that is designed to capture, store, manipulate, analyze, manage, and/or present one or more types of spatial or geographic data. As used herein, the term "geospatial data" may mean information about a physical object that can be represented by numerical values in a geographic coordinate system, and the term "geo-coding" may mean the process of converting addresses (such as "1600 Amphitheatre Parkway, Mountain View, Calif.") into geographic coordinates (such as latitude 37.423021 and longitude −122.083739) that can be used to identify positions on a map.

One way to identify columns with geospatial data is by the column label, if it is given. However, as noted above, there are several problems with this approach. First, column labels can be ambiguous, misleading, or missing. Second, crucial data is often embedded within other data in a column and must be extracted in order to be useful. Third, data such as street addresses may be contained in one column, or the data may be spread across multiple columns. Fourth, geospatial data can be coded according to standard coding schemes, which are usually expressed as integers and require a dictionary lookup to translate to a geospatial location. Fifth, data can be expressed using a variety of formats, spellings, and abbreviations.

With reference now to FIGS. 1-12, examples of a computer-implemented system and method for searching any structured data source for an attribute of interest (such as geospatial location) and determining column labels and their mapping to the attribute of interest is described. Present invention embodiments may help facilitate data wrangling when (a) location data is spread across multiple columns, (b) location data is aggregated with other data within a column, (c) location data is coded, and/or (d) column names are missing, ambiguous, or misleading.

Figure 1:
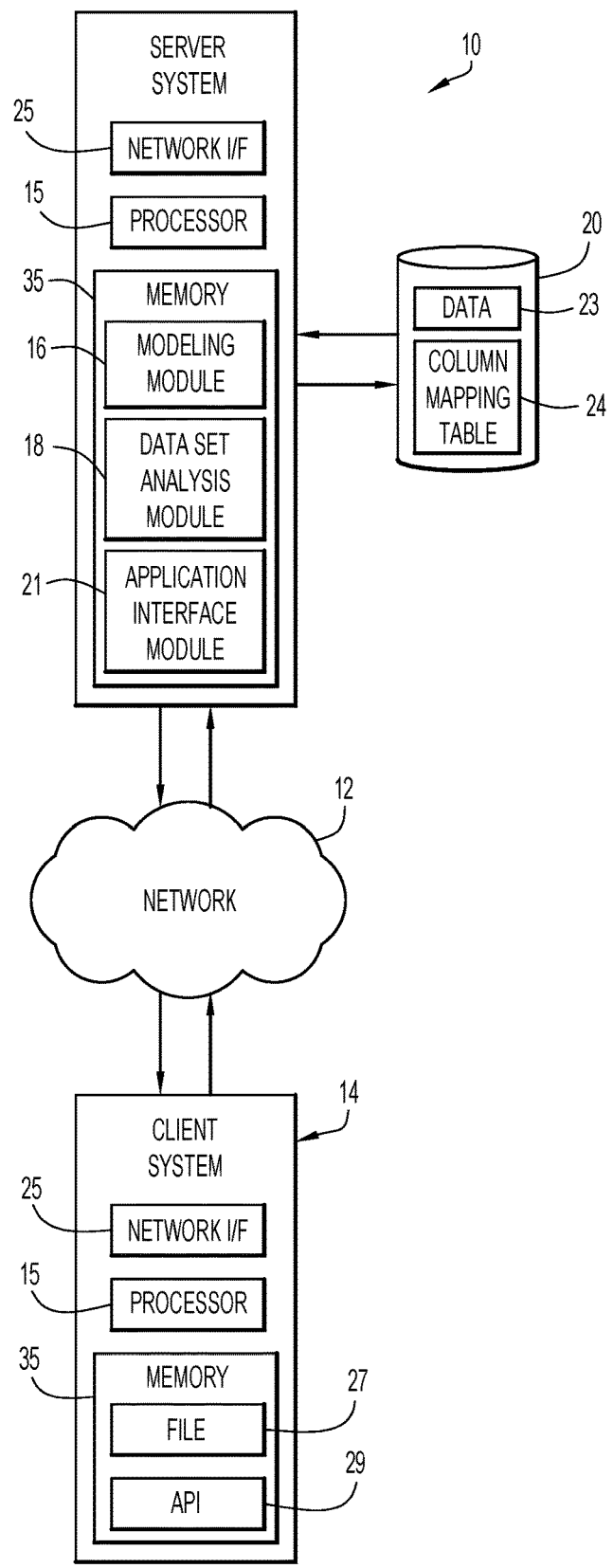
FIG. 1 is a diagrammatic illustration of an example computing environment implementing an embodiment of the present invention.

An example environment for use with present invention embodiments is illustrated in FIG. 1. Specifically, the environment includes one or more server systems 10, and one or more client or end-user systems 14. Server systems 10 and client systems 14 may be remote from each other and communicate over a network 12. The network may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

In an example embodiment, server systems 10 may include a modeling module 16 for training models to identify primary and secondary attributes of desired data (such as location data) in a data set, a data set analysis module 18 for applying the data set to the trained models to determine the data within the data set, and an application interface module 21 for generating column mapping tables or normalized data sets for use by another program or system. Client systems 14 may store files 27 containing data sets for analysis and may include an application programming interface ("API") 29 that enables a user to upload a file containing a data set for analysis by server systems 10 and may enable a user to make use of the results of the analyses with another program or system. A database system 20 may store data 23 for the analyses (e.g., data sets containing location data) and/or the results 24 of the analyses (e.g., column mapping tables, normalized data sets, etc.). The database system 20 may be implemented by any conventional or other database or storage unit, may be local to or remote from server systems 10 and client systems 14, and may communicate via any appropriate communication medium (e.g., local area network (LAN), wide area network (WAN), Internet, hardwire, wireless link, Intranet, etc.). The client systems 14 may present a graphical user interface (e.g., GUI, etc.) or other interface (e.g., command line prompts, menu screens, etc.) to accept input from users (e.g., files containing data sets with location data, etc.) and display/utilize the results of analyses performed by the server systems 10 (e.g., column mapping tables, normalized data sets, etc.).

Server systems 10 and client systems 14 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, browser/interface software, etc.).

Alternatively, one or more client systems 14 may train the models and/or perform the analyses in a stand-alone mode of operation. In a stand-alone mode of operation, the client system stores or has access to the data (e.g., database 20), and includes module 16 to train the models, module 18 to perform analyses using the models, and/or module 21 to generate results that may be used with another program or system. The graphical user interface (e.g., GUI, etc.) or other interface (e.g., command line prompts, menu screens, etc.) accepts inputs from a user and may present the results of the analyses.

Two or more of modules 16, 18, and 21 may be combined into a single module. Alternatively, modules 16, 18, and 21 may be separate as shown, and it will be appreciated that any or all of the modules may include one or more modules or units to perform the various functions of present invention embodiments described below. The various modules (e.g., modules 16, 18, and 21) may be implemented by any combination of any quantity of software and/or hardware modules or units, and may reside within memory 35 of the server and/or client systems for execution by processor 15.

Present invention embodiments may divide the attributes of interest into two categories—primary and secondary. Primary attributes are those which are needed by an application program or system. For example, in the case of a geospatial application or system, primary attributes are those which are needed to plot geospatial data on a geographic coordinate system, such as a map, either as points or shapes. Examples of primary attributes are city, zip code, street address, geographic coordinates (latitude, longitude), and county. Secondary attributes are those which are typically less important by themselves but, when merged with other secondary attributes, they can either be used to generate the primary attribute or to help in deducing the primary attribute.

Figure 2A:
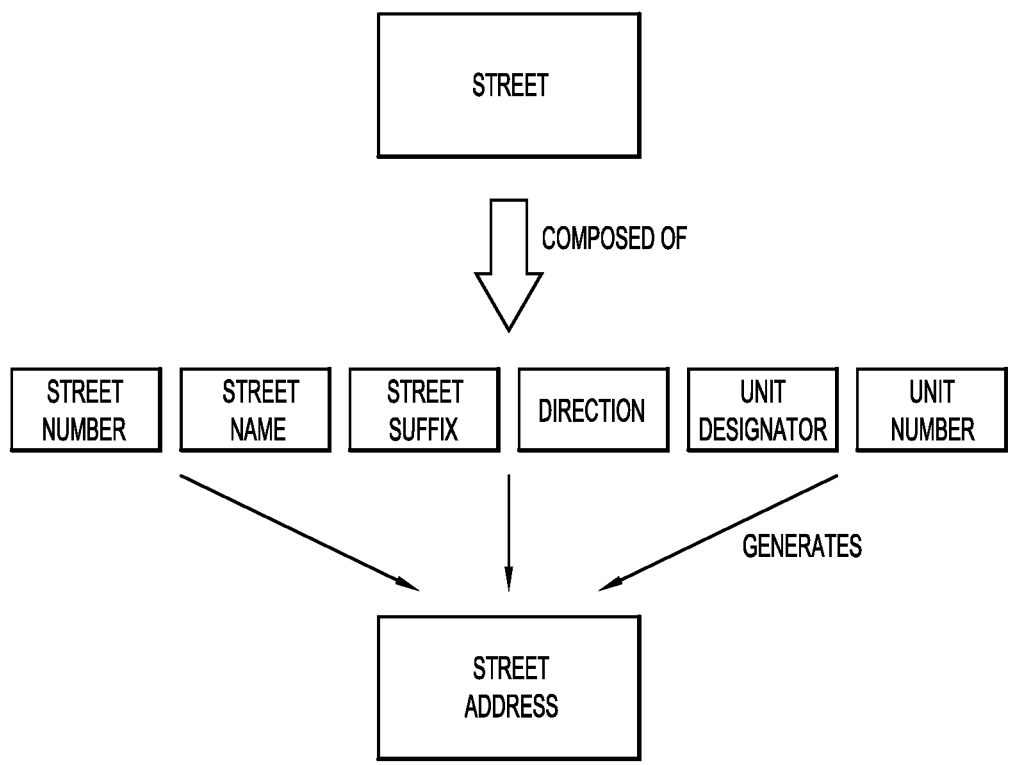
FIGS. 2A and 2B are diagrammatic illustrations of primary and secondary attributes of location data according to an example embodiment of the present invention.
Figure 2B:
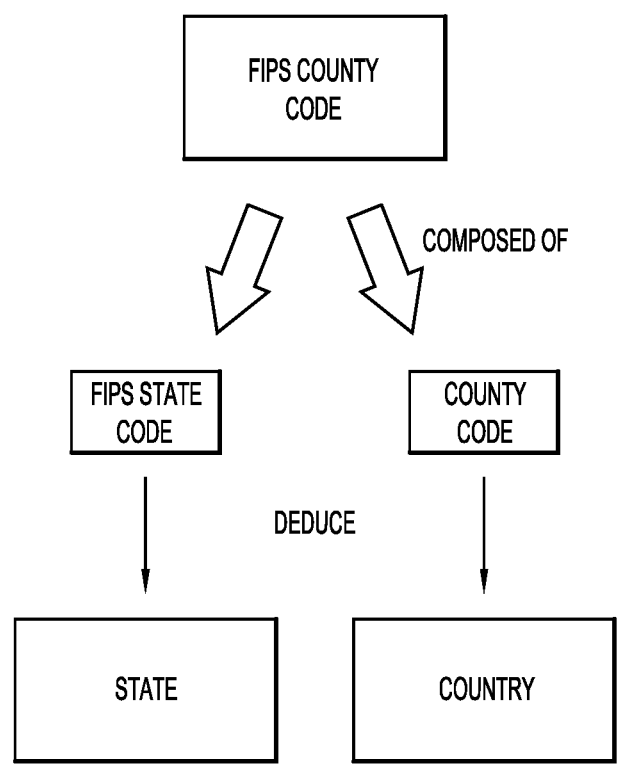

FIGS. 2A and 2B illustrate examples of primary and secondary attributes. FIG. 2A illustrates how two or more secondary attributes such as "Street Number," "Street Name," "Street Suffix" (e.g., road, lane, way, circle, etc.), "Direction" (e.g., North, South, East, or West), "Unit Designator" (e.g., apartment, unit, suite, etc.), and "Unit Number" can be used to generate the primary attribute "Street Address." FIG. 2B, illustrates how the primary attributes "State" and "County" may be deduced from the secondary attribute "FIPS County Code," which is composed of a "FIPS State Code" and a "County Code."

Present invention embodiments may be configured to automatically detect any primary or secondary attribute in a structured data set and to generate an output (such as a column mapping table or a normalized dataset) that can be used by another program or system to obtain the attribute from the original data set or a new data set.

Figure 3:
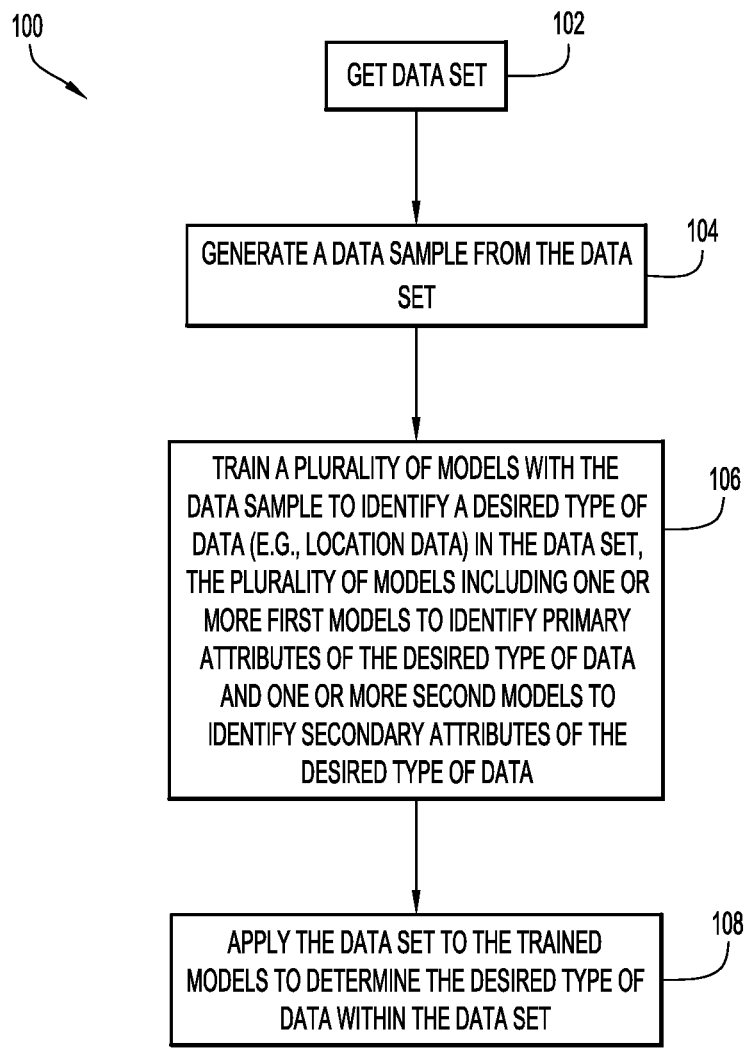
FIG. 3 is a procedural flowchart illustrating a manner of identifying a desired type of data within a data set.

A manner of identifying attributes of a desired class or type of data (such as location data) in a data set according to an example embodiment is illustrated in FIG. 3 at 100. Initially, a data set is obtained in step 102 (e.g., via modeling module 16 running on at least one server system 10 and/or a client system 14). The data set may be a structured data set, including but not limited to a data set in comma separated values ("CSV") format, extensible markup language ("XML") format, keyhole markup language ("KML") format, etc. In an example embodiment, the data set may be obtained from database 20 and/or memory 35. A data sample is generated from the data set in step 104 (e.g., via modeling module 16 running on at least one server system 10 and/or a client system 14). A manner of generating a data sample according to an example embodiment is described below with reference to FIG. 5. In step 106, a plurality of models are trained with the data sample to identify the location data in the data set (e.g., via modeling module 16 running on at least one server system 10 and/or a client system 14). In an example embodiment, the plurality of models includes one or more first models to identify primary attributes of the desired class of data (e.g., location data indicating a geographical area) and one or more second models to identify secondary attributes of the desired data used to determine corresponding primary attributes. A manner of training the models according to an example embodiment is described below with reference to FIG. 6. The data set may then be applied to the trained models in step 108 (e.g., via data set analysis module 18 running on at least one server system 10 and/or a client system 14), to determine the location of the desired type of data within the data set. In an example embodiment, an output (such as a column mapping table or a normalized dataset) may be generated (e.g., via application interface module 21 running on at least one server system 10 and/or a client system 14), that can be used by another program or system to obtain the attribute from the original data set or a new data set.

Figure 4:
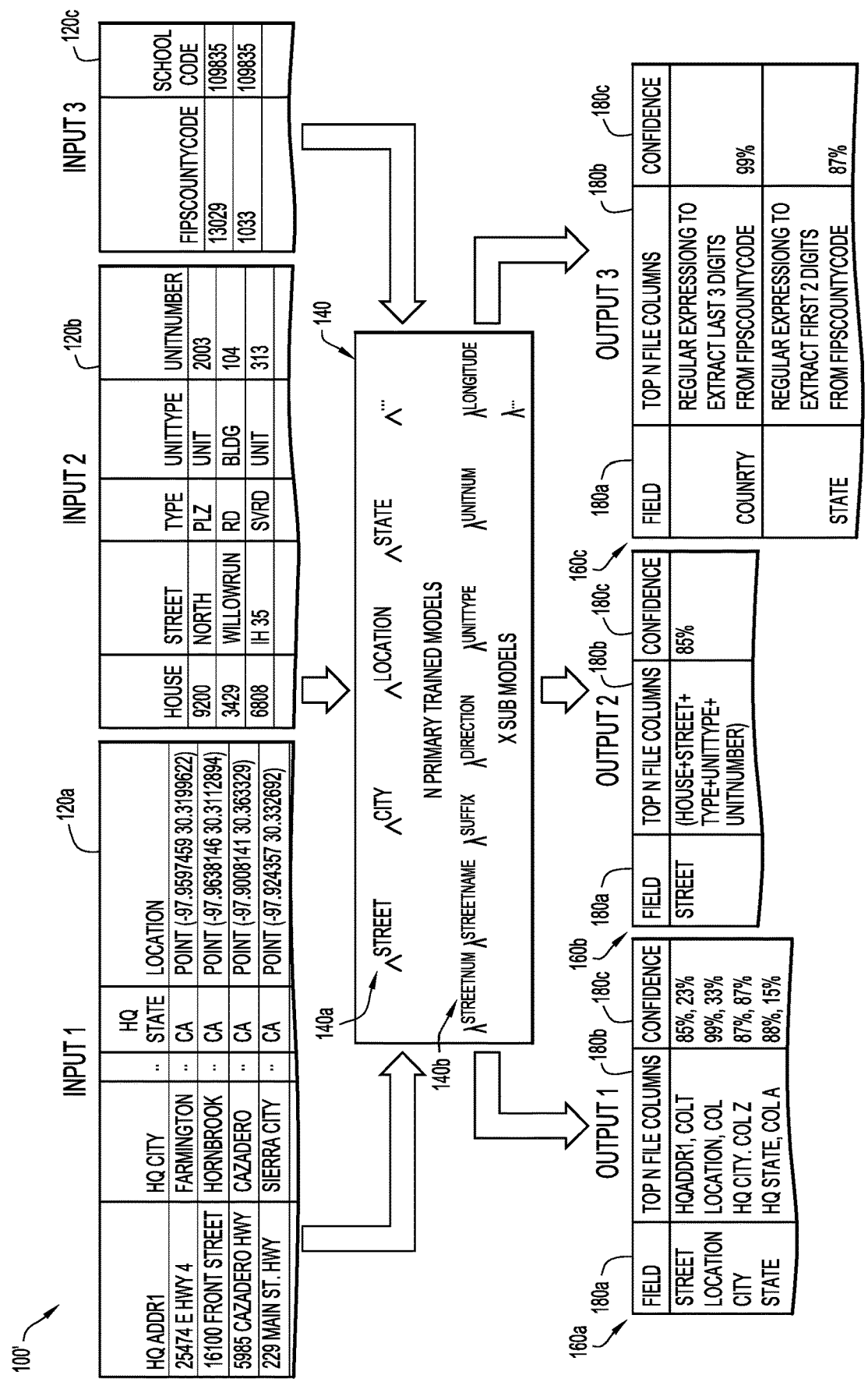
FIG. 4 is a diagrammatic illustration of inputs to and outputs from a plurality of trained models according to an example embodiment of the present invention.

FIG. 4 illustrates an example embodiment 100' in which data sets 120a, 120b, and 120c containing location data are inputs. One or more data samples are generated from the data sets and are used to train a plurality of models 140 to identify the location data in the data sets. In the example embodiment shown in FIG. 4, the plurality of models 140 include one or more first models 140a to identify primary attributes of the location data indicating a geographical area and one or more second models 140b to identify secondary attributes of the location data used to determine corresponding primary attributes. The data sets 120a, 120b, and 120c may then be applied to the trained models 140 to determine location data within the data set. For example, as shown in FIG. 4, column mapping tables 160a, 160b, and 160c may be generated. In an example embodiment, one or more of the column mapping tables may include a first column 180a listing primary attributes, a second column 180b listing the location of secondary attributes in the data sets from which the primary attributes may be generated or deduced, and a third column 180c listing a confidence level associated with the information in the second column.

Figure 5:
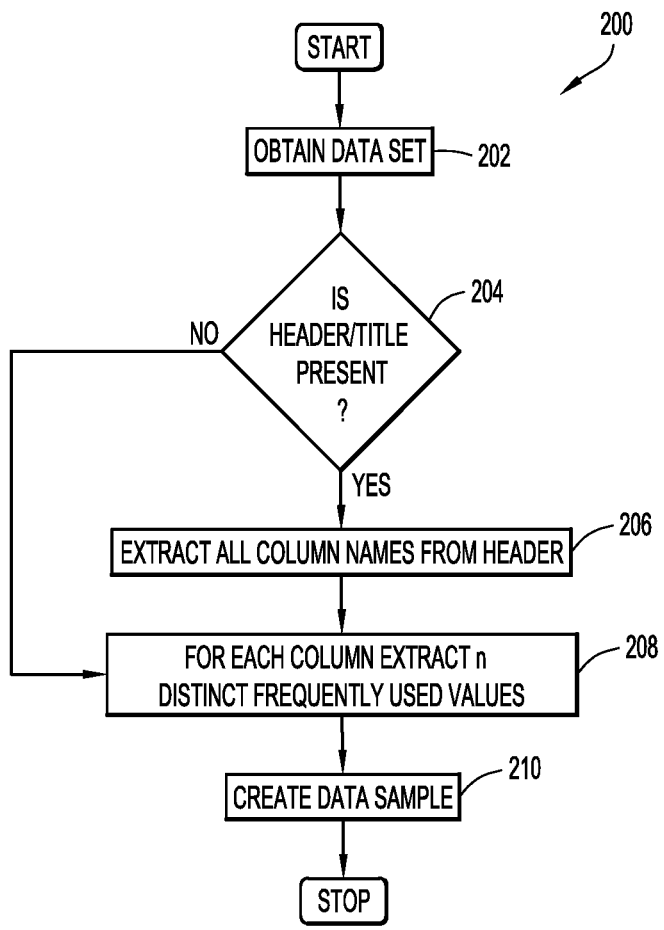
FIG. 5 is a procedural flowchart illustrating a manner of generating a data sample from a data set according to an example embodiment of the present invention.

A manner of generating a data sample for training models according to an example embodiment is illustrated in FIG. 5 at 200. In an example embodiment, the data sample may be generated via modeling module 16 running on at least one server system 10 and/or a client system 14. Initially, a raw data set is obtained at step 202. The data set may be a structured data set, including but not limited to a data set in comma separated values ("CSV") format, extensible markup language ("XML") format, keyhole markup language ("KML") format, etc. In an example embodiment, the data set may be obtained from database 20 and/or memory 35. At step 204, a determination is made whether or not a column header or title is present in the data set. If a column header or title is present, all column headers or titles (column names) are extracted from the data set at step 206, in order to take advantage of existing metadata in the file. If no column header or title is present, step 206 may be skipped. For each column, a sample containing n most frequently used values for the column is extracted at step 208. Considering multiple column values allows differentiation of columns containing data of interest from other columns when the header is missing or ambiguous. The selection of multiple values also allows differentiation of attributes of one class from another in scenarios where values could be common across multiple classes (e.g., when a value, such as "New York", is both a city and a state). In an example embodiment, n may be equal to or greater than 5.

In step 210, a data sample is created containing all the column headers/titles and values extracted in steps 206 and 208. For example, a sample may include the following:

<column header> <column value 1><column value 2> . . . <column value n>

In an example embodiment, column values 1 through n are preferably distinct values to facilitate disambiguation of attributes when there is overlap in data. While random sampling may be used, the selection process described above is preferred to avoid extracting empty or null values. The data sample may be stored in database 20 or memory 35.

The sample selection process described above may be used to generate a data sample for training models to recognize primary attributes. It will be appreciated that the same sample selection process may be used for both training and testing the models. For training, a user may provide the labels (e.g., via API 29 running on client system 14).

Figure 6:
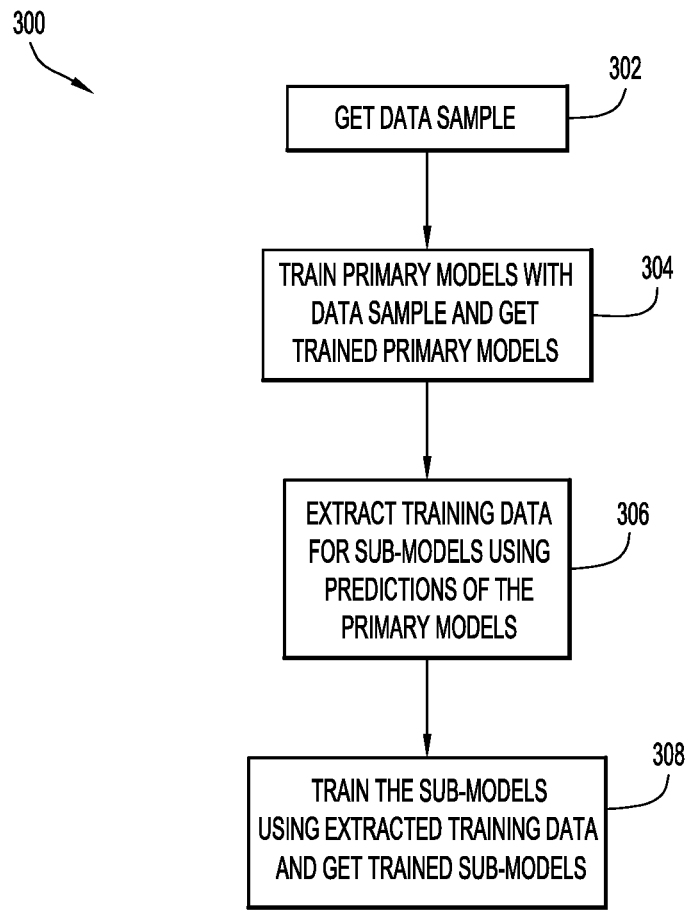
FIG. 6 is a procedural flowchart illustrating a manner of training models and sub-models according to an example embodiment of the present invention.
Figure 7:
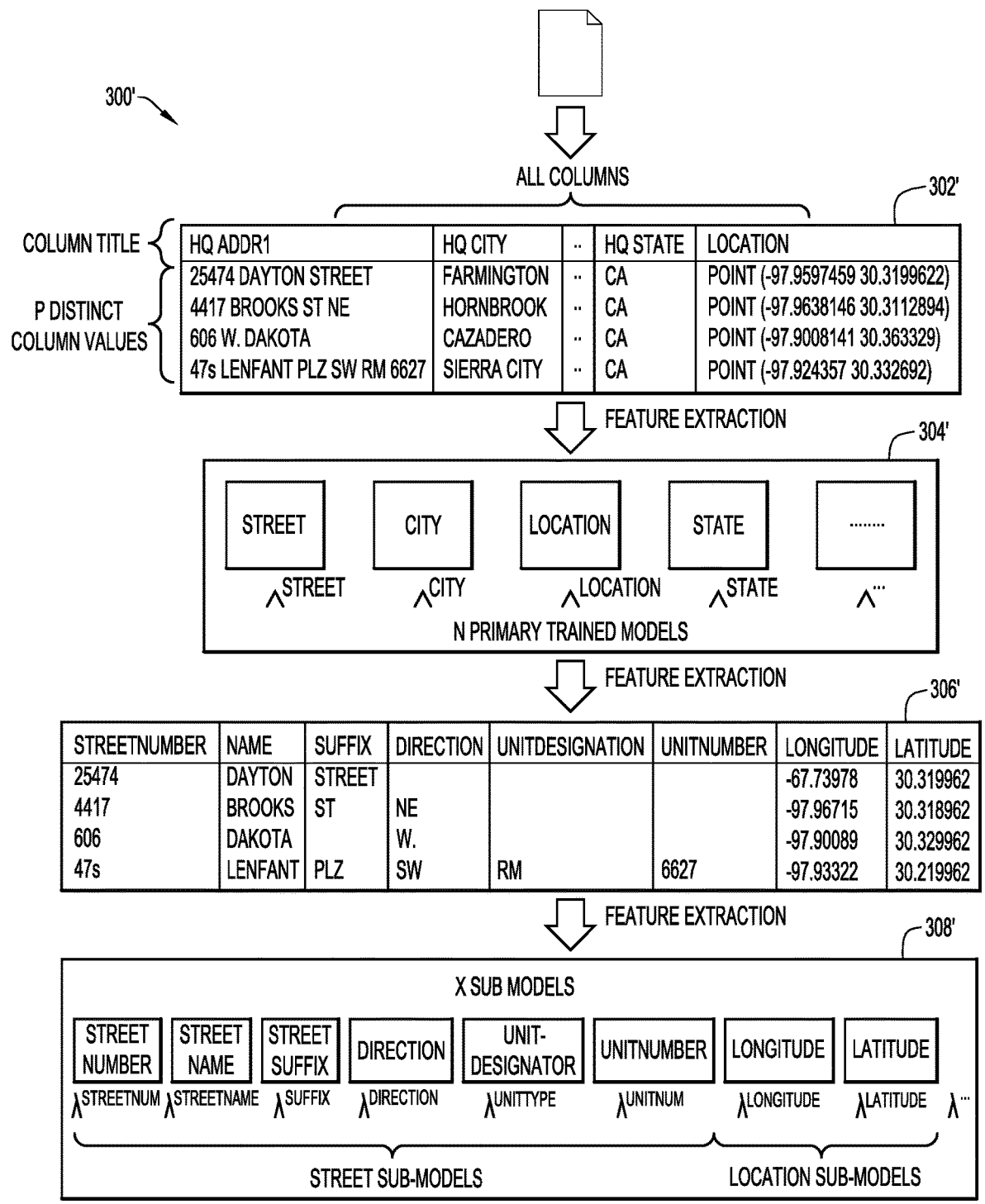
FIG. 7 is a diagrammatic illustration of a manner of training models and sub-models according to an example embodiment of the present invention.

A manner of training models to recognize primary and secondary attributes in a data set according to an example embodiment is illustrated in FIG. 6 at 300. In an example embodiment, the models may be trained via modeling module 16 running on at least one server system 10 and/or a client system 14. Initially, a data sample is obtained at step 302 to serve as training data. In an example embodiment, the data sample used to train the models may be obtained using the process illustrated in FIG. 5. An example data sample including a plurality of column titles and a plurality of distinct column values for each column title is shown in FIG. 7 at 302'.

In step 304, models are trained to recognize primary attributes in the data set using the data sample. In an example embodiment, a discriminative classifier such as a support vector machine ("SVM") may be used on the data sample to train models for each primary attribute of interest. Given labeled training data, a SVM outputs a hyperplane that categorizes new data. Feature extraction and selection processes, such as those illustrated in FIGS. 8 and 9, may also be used. Since each attribute may include different sets of features, the training process may be treated as a binary classification task (e.g., determining whether a column belongs to a particular attribute or not). Step 304 results in a plurality of trained primary models, such as the primary models shown in FIG. 7 at 304'.

In step 306, training data for sub-models is extracted using predictions of the primary models obtained in step 304. An example of training data extracted using predictions of the primary models is shown in FIG. 7 at 306'. In the example shown in FIG. 7, the training data includes secondary attributes associated with street and location, respectively.

The sub-models are trained using the extracted training data in step 308, which results in a plurality of trained sub-models. Feature extraction, feature selection, and dictionary lookup processes may also be used. In an example embodiment, the sub-models may be trained to recognize secondary attributes in the data set. An example of sub-models for the secondary attributes associated with the primary attributes street and location are shown in FIG. 7 at 308'.

Figure 8:
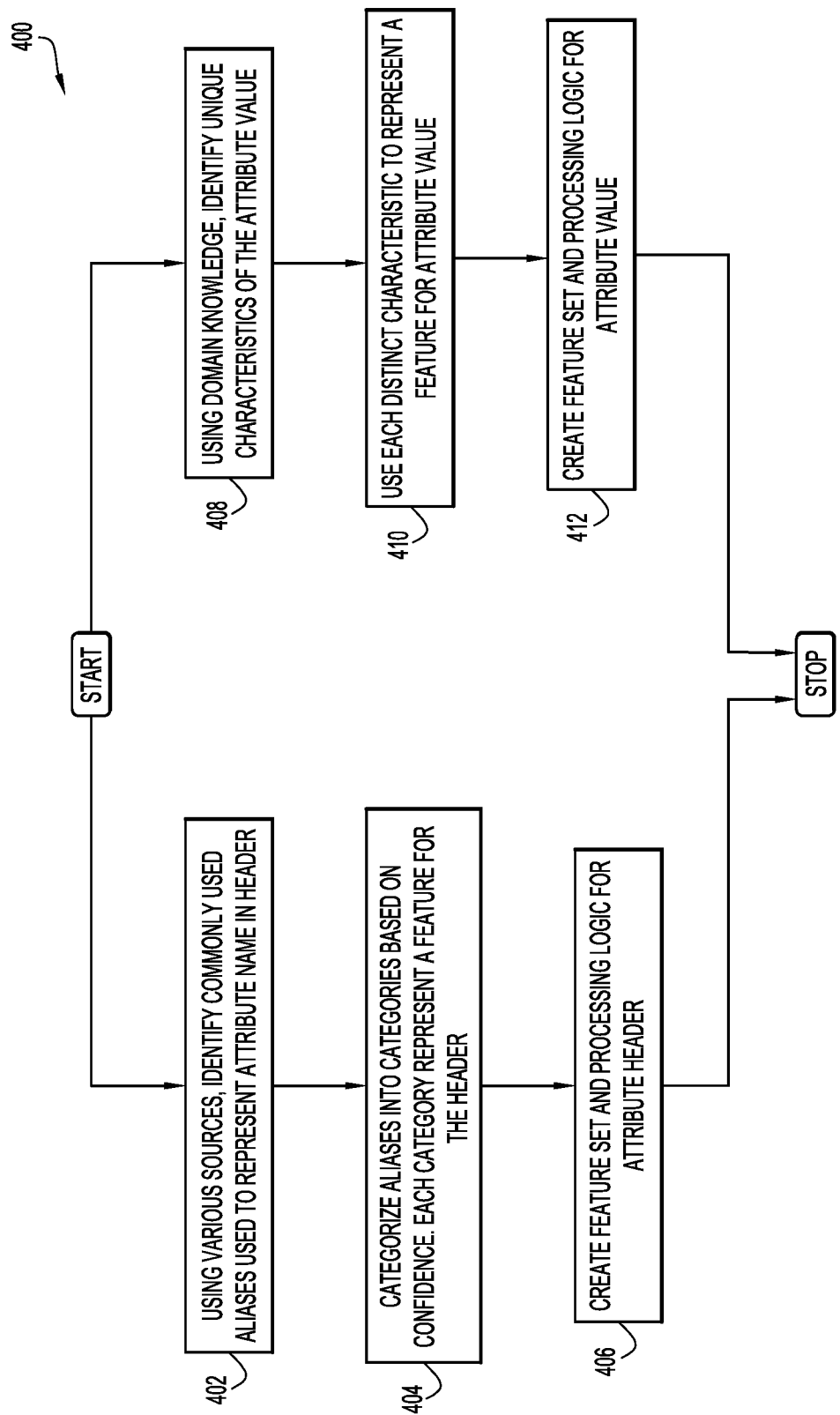
FIG. 8 is a procedural flowchart illustrating a manner of feature selection according to an example embodiment of the present invention.

FIG. 8 shows an example embodiment of a feature selection process 400 that may be used to categorize features for headers and features for attribute values. In an example embodiment, the feature selection process may be implemented via modeling module 16 running on at least one server system 10 and/or a client system 14. For each attribute, commonly used aliases or labels that represent an attribute name in a header are identified in step 402. In an example embodiment, one or more sources (such as a lookup table) may be employed to identify the commonly used aliases or labels. For example, "Zip", "zipcode", "postal_code", "mailing code", and "zip code" are examples of aliases or labels commonly used as headers to represent zip code in a structured source. The selection process may also look for strings that may be ambiguous but provide a clue that the column contains domain specific data. For example, columns that may contain "zip", "mailing", or "postal" as a substring might contain some location data. The identified aliases may be categorized into categories based on confidence in step 404, wherein each category is used to represent a feature. A feature set and processing for the attribute header may then be created in step 406.

For each attribute, domain knowledge may be used to identify a unique or distinct characteristic of each attribute value in step 408. Such characteristics may help in uniquely identifying the attribute value. Examples of such characteristics may include, but are not limited to, maximum/minimum length, type of characters (e.g., numbers only, alphanumeric, etc.), and supported formats. Each distinct characteristic may be used to represent a feature for the attribute value in step 410, and a feature set and processing logic may be created for the attribute value in step 412.

Figure 9:
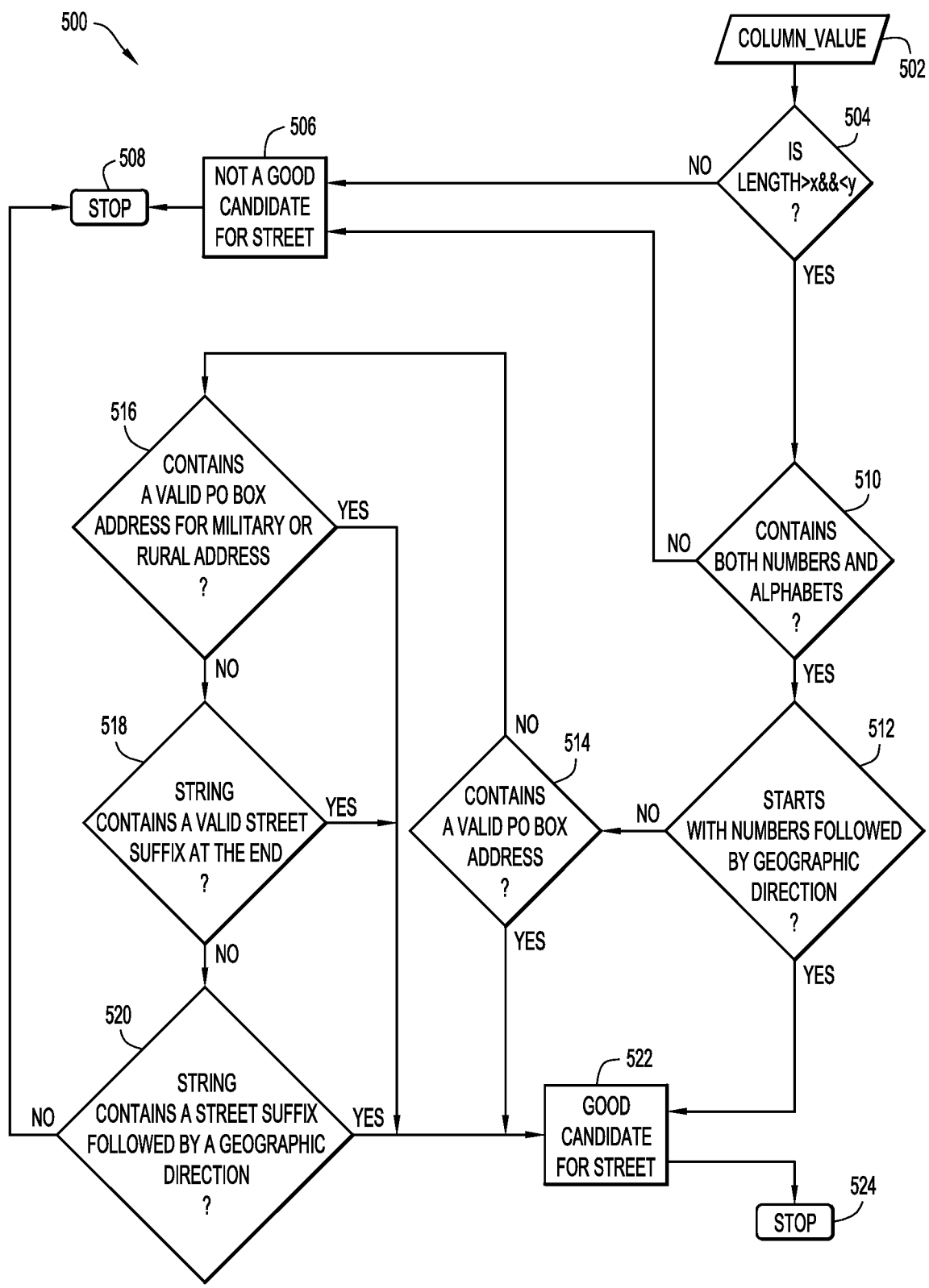
FIG. 9 is a procedural flowchart illustrating a manner of processing features according to an example embodiment of the present invention.

FIG. 9 shows an example embodiment of a feature selection process 500 for determining if a column value in a data sample is a good candidate for "Street," which is an example of a geospatial attribute. The "Street" attribute in this example refers to a U.S. street address. In an example embodiment, the feature selection process may be performed via modeling module 16 running on at least one server system 10 and/or a client system 14.

Initially, a column value is obtained at step 502. A determination is made at step 504 if the length of the value is greater than x and less than y, where x and y are predetermined numerical values. If the length of the value does not fall within the range specified in step 504, the value is deemed to not be a good candidate for "Street" in step 506, and the process stops at 508. However, if the length of the value falls within the range specified in step 504, a determination is made whether the column value contains both numbers and letters in step 510. If the column value does not contain both numbers and letters, it is deemed to not be a good candidate for "Street" in step 506, and the process stops at 508. If the column value does contain both numbers and letters, a determination is made whether the column value starts with numbers followed by geographic direction at step 512. If it is determined that the column value starts with numbers followed by geographic direction, the column value is deemed to be a good candidate for "Street" in step 522. If not, a determination is made whether the column value contains a valid P.O. Box address in step 514. If it is determined that the column value contains a valid P.O. Box address, the column value is deemed to be a good candidate for "Street" in step 522. If it does not, the process proceeds to step 516.

In step 516, a determination is made whether the column value contains a valid P.O. Box address for a military or rural address. If it determined that the column value contains a valid P.O. Box address for a military or rural address, the column value is deemed to be a good candidate for "Street" in step 522. If not, a determination is made whether the column value includes a string that contains a valid street suffix at the end in step 518. If it is determined that the column value includes a string that contains a valid street suffix, the column value is deemed to be a good candidate for "Street" in step 522. If not, a determination is made whether the string contains a street suffix followed by a geographic location in step 520. If it is determined that the string contains a street suffix followed by a geographic location, the column value is deemed to be a good candidate for "Street" in step 522. If not, the column value is deemed to not be a good candidate for "Street" and the process stops at 508.

Column headers or titles can be a strong indicator of column meaning, so if a file has a column header (indicated as an input parameter), it can be accounted for in the model training process. For example, 'zip', 'zipcode', 'postal code' and 'zip code' are some of the labels commonly used to represent U.S. zip codes. A feature may be created to recognize if the column header directly matches a synonym or alias. Features can also be created for scenarios in which the column header contains a commonly used synonym or alias together with other text. For example, 'name of state' contains 'state' which is a commonly seen term to represent state. Table VI provides a listing of features that may be defined around column headers. These features may be common across all categories or attributes.

TABLE VI

Features Around Column Labels.

Features Common To All Categories

Column label is identical to commonly used synonyms for that category. For example: Zip, Zip Code, Postal Code, Zip_Code are some commonly used synonyms to represent U.S zip code.
Column label contains commonly used terms to represent category. For example: City would be a common term used to represent U.S City. The column label could be Mailing City, Postal City, City Name where City is available as a complete word.
Column label contains commonly used terms to represent category as an embedded word. For example: Zip, Postal would be a common term used to represent U.S zip code. The column label could be MailingZip, PostalZip, Postal, PostalAddress where Zip or Postal are available as an embedded word.

Features may be defined over the column values themselves. For each category or attribute of interest, heuristics may be developed to describe the possible formats for that class, and a set of features may be developed based on how well the column value matches the description. For example, for street address, the following characteristics may be considered: the length of the string, whether it contains a valid P.O. Box, military or rural route format, street suffixes, and directions. FIG. 10 provides a listing of example features that may be defined around column value for each category or attribute. The sequence in which features are evaluated can be important in terms of processing speed, as it can act as a filter to quickly eliminate non-candidate columns for a category. For example, if the column value contains characters that are not appropriate for a category (such as digits for state names), a decision may be made not to evaluate the column against the rest of the feature set.

For certain categories or attributes, such as state and state codes, where the number of possible values is relatively low, a dictionary lookup may be used. In an example embodiment, the lookup is only performed if the column value contains characters valid for the category and satisfies a length range check. The same dictionary can also serve as a negative indicator for other categories. For example, while validating a column value as a city, it is possible to check if the string matches any state name. If it does, the result can be treated as a negative indicator for city.

Figure 11:
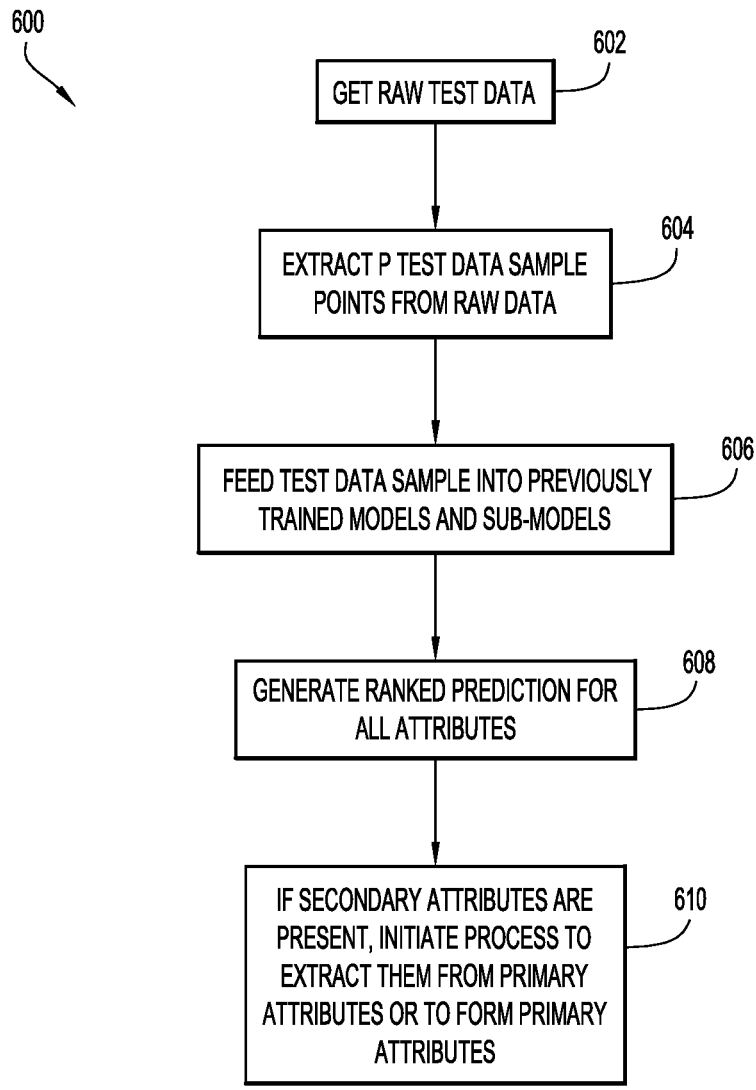
FIG. 11 is a procedural flowchart illustrating a manner of testing with primary models and sub-models according to an example embodiment of the present invention.

FIG. 11 shows an example embodiment of a process 600 for testing with primary models and sub-models. In an example embodiment, the testing process may be performed via analysis module 18 running on at least one server system 10 and/or a client system 14. Initially, in step 602, raw test data is obtained. The test data may be the original data set or a different data set. In step 604, a test data sample of P test data points is extracted from the raw test data. In an example embodiment, the data sample generation process illustrated in FIG. 5 may be used to extract a test data sample from the raw test data. In step 606, the test data sample is fed into the trained models and sub-models, which generate ranked predictions for all attributes in step 608. If secondary attributes are present, a process may be initiated to extract the secondary attributes from the primary attributes or to form primary attributes from the secondary attributes, in step 610.

Figure 12:
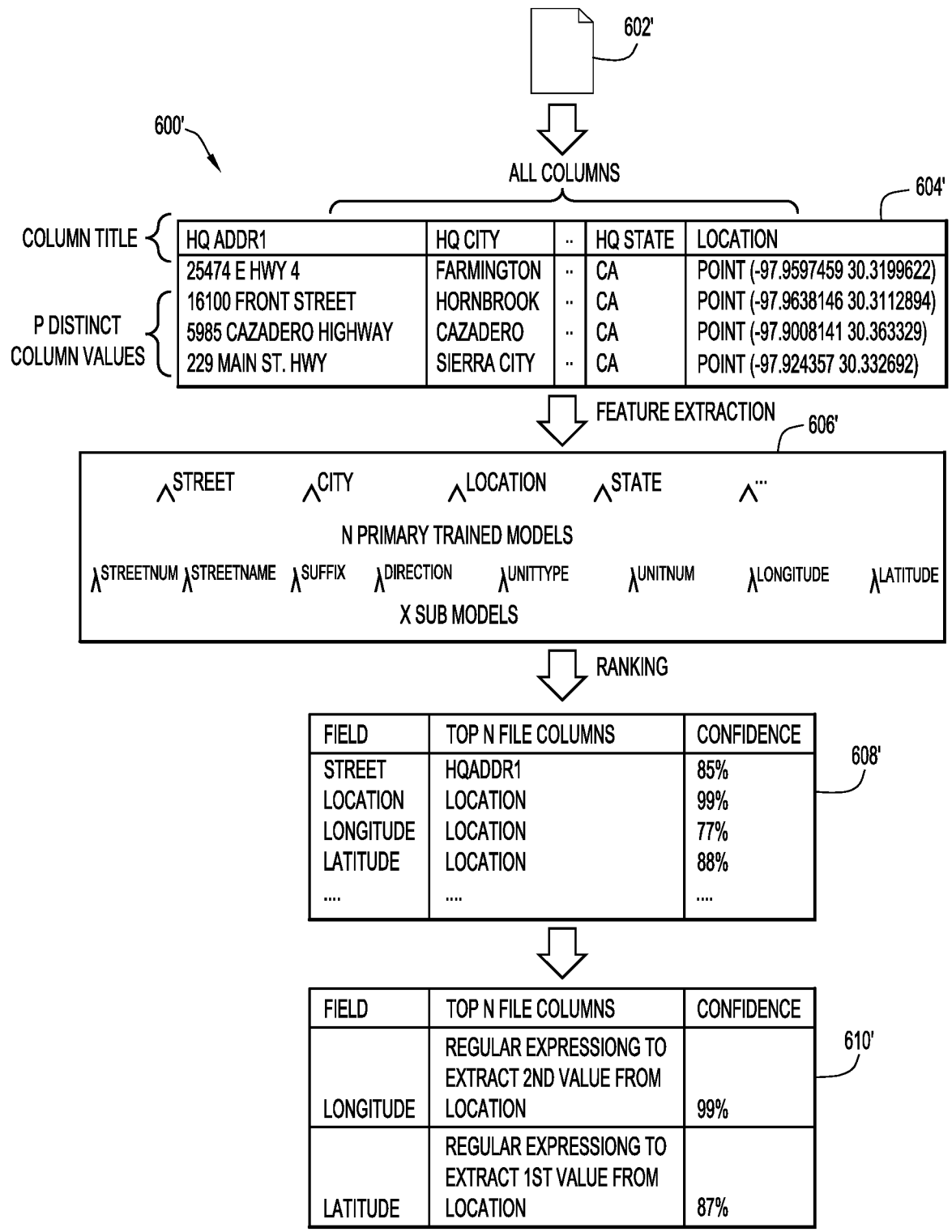
FIG. 12 is a diagrammatic illustration of a manner of training models and sub-models according to an example embodiment of the present invention.

FIG. 12 shows an example embodiment of inputs and outputs in a process 600' for testing models trained to recognize geospatial attributes. The original or test data set is illustrated at 602'. A test data sample extracted from the original or test data set and including column titles/headers and P distinct column values associated with location is illustrated at 604'. The test data sample is fed into N previously trained primary models and X previously trained sub-models, which are shown at 606'. In the example shown, the primary models include "Street," "City," "Location," and "State," and the sub-models include "Streetnum," "Streetname," "Suffix," "Direction," "Unittype," "Unitnum," "Longitude," and "Latitude." Ranked predictions for all attributes are shown at 608'. In the example shown, location attributes are listed in a first column, column names from the data set that are associated with the attributes are listed in a second column, and a confidence level for each mapping is listed in a third column. An example of ranked predictions for secondary attributes "Longitude" and "Latitude," extracted from the primary attributes, is shown at 610'. In the example shown, the secondary attributes are listed in a first column, an expression for extracting the value from the primary attribute is listed in a second column, and a confidence level is listed in a third column.

Once the training phase is complete, the models can be used to detect columns that contain attributes of interest, such as geospatial (location) information, in the original data set or a new data set. In an example embodiment, the column values of the data set may be sampled to consider only the most frequent values for each column. The sampling process as described above may be used to construct a data sample from the data set. The data sample may then be passed to each model, one or more of which may include a classifier. In an example embodiment, the classifier trained for each of the attributes or categories provides confidence estimates of match for every column in the file. For each category or attribute, the confidence estimates may be normalized to fall within a range of 0 to 100% using a squashing function, $100/(1+\exp(-t))$, where 't' is the confidence estimate obtained from the corresponding classifier. A plurality of the most likely candidates (e.g., based on the confidence estimates) may then be determined for each category. For example, the models may output a table in which the first column shows the category or attribute of interest, the second column shows the most likely column candidates for each of the categories, and the normalized confidence estimates are also displayed with each column. In an example embodiment, the user may be provided with an ability to override the match (e.g., via API 29 funning on client system 14). For example, API may display the table and allow the user to manually select a different column candidate using a drop-down menu listing the most likely column candidates. In another embodiment, the user may be given an option of providing feedback based on the performance of the models (e.g., via API 29 running on client system 14). For example, if the classification output provides multiple candidates but the user wants to pick one that does not have the highest confidence estimate, the system can be dynamically retrained using the user's feedback.

It will be appreciated that present invention embodiments may be configured to detect relevant data spread across multiple columns, coded data (inferred data), and relevant data embedded with other data. Present invention embodiments may also be configured to detect U.S. street address and commonly used formats location coordinates (latitude, longitude). Present invention embodiments may further be configured to recognize attributes of interest in data sets that do not have column labels or in which the column labels are ambiguous. Present invention embodiments may also be configured to analyze data in any known format. Present invention embodiments may also provide a scalable architecture that isn't domain specific (e.g., models can be added/deleted/updated as needed to support new attributes as well as formats), and present invention embodiments may be configured so as not to require an exhaustive list (dictionary) of all supported values for an attribute, so there is no maintenance issue.

It will be appreciated that the embodiments described above and illustrated in the drawings represent only a few of the many ways of determining columns in a data set that contain attributes of interest, such as location data. For example, a number of different approaches can be used to detect column mapping, such as top down (predictive learning is done using primary models), bottom up (predictive learning is done using sub-models), and a hybrid approach (predictive learning is done using both primary models and sub-models).

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, modeling module, analysis module, etc.). These systems may include any types of monitors and input devices (e.g., keyboard, mouse, voice recognition, etc.) to enter and/or view information.

It is to be understood that the software (e.g., modeling module 16, analysis module 18, application interface module 21, API 29, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., modeling module 16, analysis module 18, application interface module 21, API 29, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., structured data sets, column mapping tables, normalized data sets, etc.). The database system may be implemented by any number of any conventional or other databases, data stores or storage structures (e.g., files, databases, data structures, data or other repositories, etc.) to store information (e.g., structured data sets, column mapping tables, normalized data sets, etc.). The database system may be included within or coupled to the server and/or client systems. The database systems and/or storage structures may be remote from or local to the computer or other processing systems, and may store any desired data (e.g., structured data sets, column mapping tables, normalized data sets, etc.).

The present invention embodiments may employ any number of any type of user interface (e.g., Graphical User Interface (GUI), command-line, prompt, etc.) for obtaining or providing information (e.g., user feedback, manual selection of column candidates), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to identifying location data in a data set. Other classes of data having one or more primary attributes composed of, or deducible from, secondary attributes, may be identified using the techniques described herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A system for determining location data in a data set comprising at least one processor configured to:
   generate a data sample from the data set;
   train a plurality of models with the data sample to identify the location data in the data set, wherein the plurality of models includes one or more first models to identify primary attributes of the location data specifying a geographical area and one or more second models to identify secondary attributes of the location data that, in combination, determine corresponding primary attributes, and wherein training the plurality of models comprises:
      training the one or more first models with the data sample to identify the primary attributes; and
      training the one or more second models with the data sample and the primary attributes identified from the one or more first models to determine the secondary attributes; and
   apply the data set to the trained models to determine the location data within the data set, wherein the location data is determined based on the primary attributes identified by the one or more first models, and the primary attributes identified based on a combination of the secondary attributes identified by the one or more second models.

2. The system of claim 1, wherein the data set includes columns of data and one or more headers for the columns, and wherein the at least one processor is configured to generate a data sample by:
   determining for insertion into the data sample a column header and one or more distinct frequently used values for each corresponding column.

3. The system of claim 1, wherein the at least one processor is further configured to:
   test the plurality of models with the data sample to produce location data; and
   re-train the plurality of models based on information received from a user pertaining to the location data produced by the plurality of models.

4. The system of claim 1, wherein the data set includes columns of data and one or more headers for the columns, and the one or more first models each identify a corresponding primary attribute and are configured to:
   extract header features and value features of the corresponding primary attribute from the data sample; and
   utilize the header features and value features to identify columns containing the corresponding primary attribute.

5. The system of claim 4, wherein the at least one processor is configured to extract the header features by:
   identifying aliases within the data sample used to represent a name of the corresponding primary attribute;
   categorizing the identified aliases into categories each representing a corresponding header feature; and
   creating a header feature set based on the categories and utilize the header feature set to identify the header of columns of the corresponding primary attribute.

6. A computer program product for determining columns containing location data in a data set, the computer program product comprising one or more computer readable storage media collectively having program instructions embodied therewith, the program instructions executable by a computer processor to cause the computer processor to:
   generate a data sample from the data set;
   train a plurality of models with the data sample to identify the location data in the data set, wherein the plurality of models includes one or more first models to identify primary attributes of the location data specifying a geographical area and one or more second models to identify secondary attributes of the location data that, in combination, determine corresponding primary attributes, and wherein training the plurality of models comprises:
      training the one or more first models with the data sample to identify the primary attributes; and
      training the one or more second models with the data sample and the primary attributes identified from the one or more first models to determine the secondary attributes; and
   apply the data set to the trained models to determine the location data within the data set, wherein the location data is determined based on the primary attributes identified by the one or more first models, and the primary attributes identified based on a combination of the secondary attributes identified by the one or more second models.

7. The computer program product of claim 6, wherein the data set includes columns of data and one or more headers for the columns, and wherein the computer processor is configured to generate a data sample by:
   determining for insertion into the data sample a column header and one or more distinct frequently used values for each corresponding column.

8. The computer program product of claim 6, wherein the computer processor is further configured to:
   test the plurality of models with the data sample to produce location data; and
   re-train the plurality of models based on information received from a user pertaining to the location data produced by the plurality of models.

9. The computer program product of claim 6, wherein the data set includes columns of data and one or more headers for the columns, and the one or more first models each identify a corresponding primary attribute and are configured to:
   extract header features and value features of the corresponding primary attribute from the data sample; and
   utilize the header features and value features to identify columns containing the corresponding primary attribute.

10. The computer program product of claim 9, wherein the computer processor is configured to extract the header features by:
    identifying aliases within the data sample used to represent a name of the corresponding primary attribute;
    categorizing the identified aliases into categories each representing a corresponding header feature; and
    creating a header feature set based on the categories and utilize the header feature set to identify the header of columns of the corresponding primary attribute.

* * * * *